No. 882,624. PATENTED MAR. 24, 1908.
W. T. BYNG.
GUIDE BLOCK OF STAMP MILLS.
APPLICATION FILED JUNE 26, 1906.
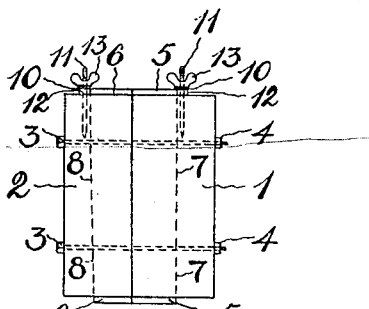
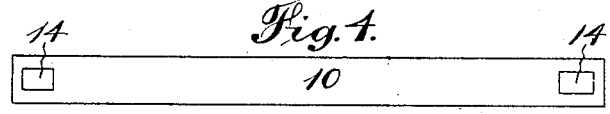
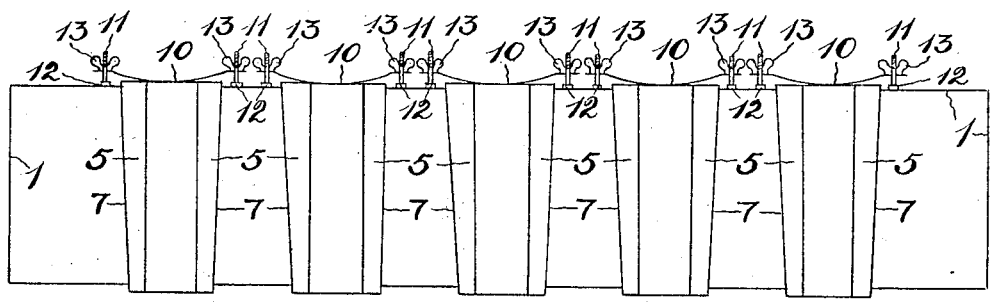
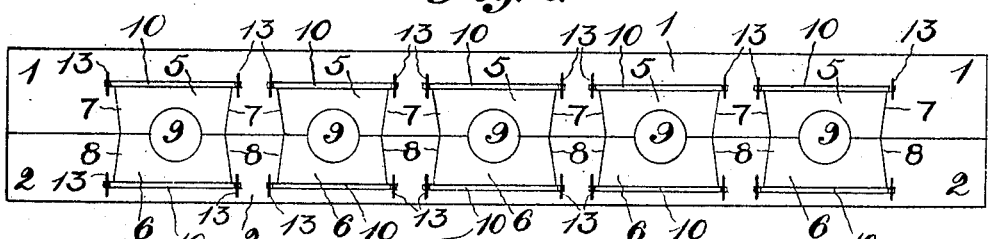
Witnesses:
Inventor:
William Thomas Byng.
by Chas Ovendale
Attorney

UNITED STATES PATENT OFFICE.

WILLIAM THOMAS BYNG, OF KRUGERSDORP, TRANSVAAL.

GUIDE-BLOCK OF STAMP-MILLS.

No. 882,624.   Specification of Letters Patent.   Patented March 24, 1908.

Application filed June 26, 1906. Serial No. 323,442.

*To all whom it may concern:*

Be it known that I, WILLIAM THOMAS BYNG, a subject of the King of Great Britain, and resident of Krugersdorp, Transvaal, have invented certain new and useful Improvements in Guide-Blocks of Stamp-Mills, of which the following is a specification.

This invention relates to the guide-blocks for the stems of the stamps of stamp-mills. It is designed with the object of avoiding stoppages of stamp batteries when it becomes necessary to change or renew such guide-blocks; to enable the guide-blocks to be renewed with greater facility than at present; and so that the frame, once it is fixed to the main frame of the battery, will be permanent, and to simplify, improve and reduce the cost of construction of such guide-blocks.

The invention consists in the novel combination of parts hereinafter described and pointed out in the appended claims.

To facilitate the description of the invention a sheet of drawings is hereunto appended, in which Figure 1 represents in plan a guide block constructed for the usual group of five stamps. Fig. 2 is a view of one half of the block as seen from the inside. Fig. 3 is an end elevation. Fig. 4 is an elevation of one of the springs, 10, detached, and Fig. 5 is a plan of Fig. 4.

The guide-block comprises the framework consisting of the two longitudinal and parallel parts 1, 2, which may be made of wood or metal. The halves 1, 2 of the framework are bolted together by means of the suitably disposed transverse bolts 3 and nuts 4, see Fig. 3. The guide-blocks or slips, which are preferably made of hard wood, are also made in two parts 5, 6, said slips or halves being secured in recesses 7, 8, formed between the halves 1, 2, of the frame by means of the bolts 3, which bolts may serve also for bolting the longitudinal parts 1, 2, to the main frame of the battery. The coincident recesses 7, 8, formed in the halves 1, 2, of the frames are made of dovetail horizontal section (see Fig. 1) and they are also tapered from the top to the bottom as shown in Fig. 2. In the vertical dovetailed and tapered recesses 7, 8, are fitted the slips 5, 6, which are dovetailed in horizontal section and tapered vertically to fit said recesses 7, 8. Between the contiguous inner faces of the slips 5, 6, are formed the cylindrical holes 9 (a hemicylindrical recess being formed in each slip) through which work the stems of the stamps.

For the purpose of keeping the slips 5, 6, in position, or preventing their lifting out of the frame with the stem of the stamp, I provide for each slip an arched or bow spring 10 arranged at or in close proximity to one edge of the slip and clear of the hemi-cylindrical recess formed therein. This spring 10 is fixed to the framework by means of coach or other suitable screws 11, on which is formed a shoulder or projection 12. The ends of the springs 10 are formed with elongated slots 14 and they are passed over the upper ends of the screws 11 and secured thereon by means of wing-nuts 13. By screwing down the nuts 13 the pressure exerted by the springs 10 may be regulated as desired. Two of the coach screws 11 are employed for each spring 10 and they are located at opposite sides of the dovetailed recesses 7, 8, so that the springs 10 take up a position lengthwise of the frame 1, 2, as shown more particularly in Fig. 1.

It will be evident that by the construction above described it is possible to remove and renew the slips 5, 6, for any one of the stamps without separating the parts 1, 2, of the framework and consequently without necessitating the stoppage of the other stamps during the operation of removing and renewing said slips 5, 6. All that is necessary to remove the slips 5, 6, is to hang up the particular stamp, then to screw off two of the wing nuts 13 and remove the springs 10 off the tops of the slips, which permits the halves to be withdrawn. The slips can then be renewed and the springs 10 turned back into position and fixed by means of the wing-nuts 13.

What I claim as my invention and desire to protect by Letters Patent is:

1. In a guide-block for the stamps of stamp-mills, the combination of the two parallel longitudinal members of the frame constructed on the inside with dovetailed and tapered recesses and the slips correspondingly dovetailed and tapered in said recesses and means for retaining said slips in said recesses, said means consisting of an arched or bow spring engaging screws fixed to the frame and wing-nuts engaging said screws and springs.

2. In a guide-block for the stamps of stamp-mills, in combination, two parallel members each formed on the inside with a recess dovetailed in horizontal section and tapered vertically from the top to the bottom, slips in each of said recesses correspondingly dovetailed and tapered and formed with hemi-cylindrical recesses, the screws fixed to the frame at opposite sides of the dovetailed recesses, arched or bow springs constructed with elongated slots engaging said screws, and wing-nuts engaging the ends of the screws above the springs, substantially as described.

In witness whereof I have hereunto set my hand in the presence of two subscribing witnesses.

WILLIAM THOMAS BYNG.

Witnesses:
 CHAS. OVENDALE,
 R. OVENDALE.